United States Patent [19]
Carr

[11] Patent Number: 4,633,686
[45] Date of Patent: Jan. 6, 1987

[54] ANTI-THEFT BRAKE LOCK

[76] Inventor: Wesley G. Carr, 244 Ohio Ave., West Springfield, Mass. 01089

[21] Appl. No.: 663,321

[22] Filed: Oct. 22, 1984

[51] Int. Cl.⁴ .......................... G05G 5/00; E05B 65/12
[52] U.S. Cl. ...................................... 70/179; 70/228; 70/237
[58] Field of Search ................. 70/175, 176, 177, 178, 70/179, 228, 237, 242; 188/141, 151 R, 353; 137/383, 384.2, 384.4, 385

[56] References Cited

U.S. PATENT DOCUMENTS

| | | | |
|---|---|---|---|
| 1,029,403 | 6/1912 | Schlatterer | 70/175 |
| 1,153,189 | 9/1951 | Blything | 70/242 |
| 2,008,375 | 7/1935 | Wheaton | 70/176 |
| 3,557,584 | 1/1971 | Triglia | 70/179 |

FOREIGN PATENT DOCUMENTS

| | | | |
|---|---|---|---|
| 254693 | 8/1927 | Italy | 70/179 |
| 1104432 | 2/1968 | United Kingdom | 70/175 |

Primary Examiner—Robert L. Wolfe
Attorney, Agent, or Firm—Hedman, Gibson, Costigan & Hoare

[57] ABSTRACT

A hydraulic wheel brake device is provided for connection between the master cylinder and the wheel brake cylinders in the brake fluid line. The device includes a lock housing connected to a hydraulic cylinder wherein the hydraulic cylinder includes a fluid chamber having an inlet and outlet in fluid communication with the chamber. A valve seat is located over the inlet in the fluid chamber and a spring is disposed in the chamber having a steel ball held therein. A lock and rotary cam mechanism are located within the lock housing wherein rotation of the lock rotates the cam mechanism thrusting a rod connected between the rotary cam mechanism and the spring. The rod forces the spring to compress which seats the ball against the valve seat restricting fluid flow to the brakes thereby locking the fluid brake system.

5 Claims, 9 Drawing Figures

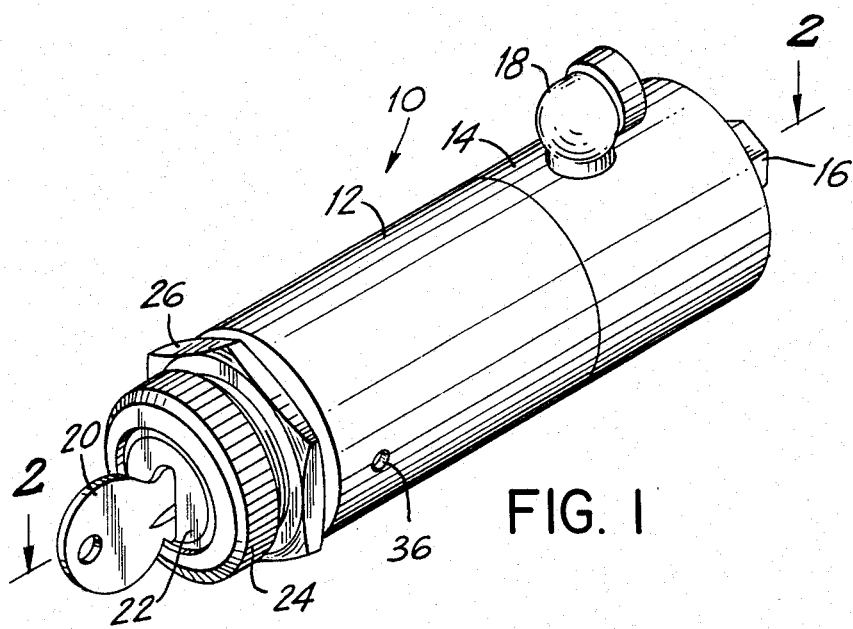
FIG. 1
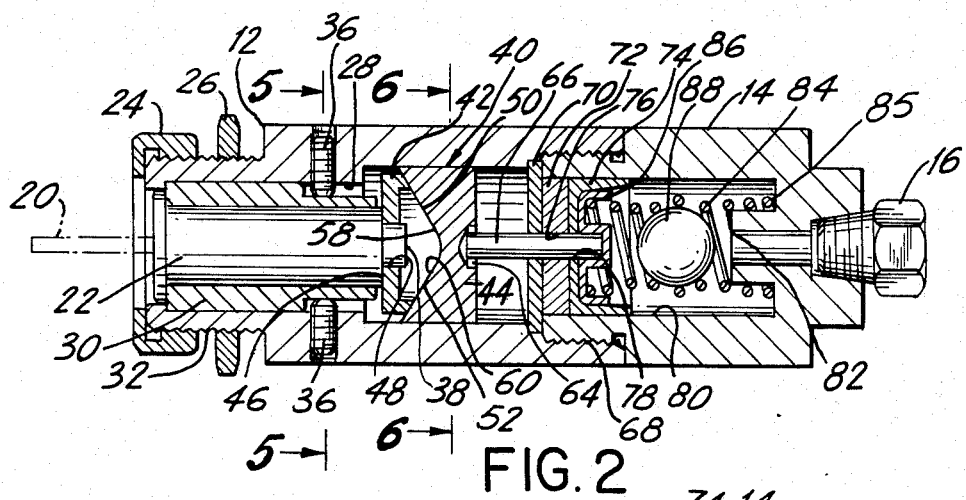
FIG. 2
FIG. 3

4,633,686

ANTI-THEFT BRAKE LOCK

BACKGROUND OF THE INVENTION

1. Field of the Invention

This invention relates to an anti-theft device for locking the brakes of a vehicle by restricting hydraulic fluid flow within the brake system.

2. Description of the Prior Art

Despite the numerous anti-theft devices available, there are large numbers of automobiles being stolen every year. The various devices now available such as alarms, ignition shut-off switches and brake locks have become complicated and more expensive without increasing their reliability or their ability to prevent automobile thefts.

The prior art brake locks are installed within the hydraulic brake system of an automobile. After the brakes have been pressurized, the lock acts to prevent fluid flow from or to the brakes. The brakes cannot be released unless the lock is deactivated. The present brake locks are intricate devices with numerous internal elements and moving parts that increase the cost of the device while decreasing reliability and durability. Thus, there is a need for a simple, affordable and dependable deterrent to automobile thefts.

SUMMARY OF THE INVENTION

In accordance with the present invention, there is provided a hydraulic check valve which will hold the hydraulic brakes in a locked position once the device is activated. The device is connected within the hydraulic brake line between the wheel brake cylinders and the master cylinder. After the brakes have been depressed pressurizing the brake fluid system, the device is actuated to inhibit the fluid flow within the brake system thereby maintaining the pressure and locking the brakes.

The device includes a hydraulic cylinder having a fluid chamber therein and a brake fluid inlet and outlet in fluid communication with the chamber. A valve seat is located within the fluid chamber and is in fluid communication with the inlet. A spring is located within the fluid chamber which has a ball valve element held within the coils of the spring. The spring is biased so that compression of the spring will press the ball valve element against the valve seat to restrict the fluid flow through the fluid chamber.

A key operated lock mechanism is attached to the hydraulic cylinder to actuate the device. Rotation of the lock acts to rotate a male cam which thrusts a female cam in communication with the male cam towards the spring. A piston means is located between the female cam and the spring which acts to compress the spring when the female cam is thrust forward. When the spring is compressed, the ball presses against the valve seat, restricting the fluid flow from the inlet to the outlet and locking the brakes. If the brake pedal is depressed prior to activating the device, the brakes will be immediately locked upon actuation. However, the device may also be actuated prior to depression of the brakes. In this case, when the brakes are then depressed, fluid flow will be permitted to the brakes but the flow back will be restricted and the ball will then firmly seat against the valve seat because of the reverse pressure of the fluid flow.

Thus, an inexpensive, simple and reliable device is provided for preventing the theft of a vehicle.

BRIEF DESCRIPTION OF THE DRAWINGS

The following is a detailed description together with accompanying drawings of an illustrative embodiment of the invention. It is to be understood that the invention is capable of modification and variation apparent to those skilled in the art within the spirit and scope of the invention.

FIG. 1 is a perspective view of the locking device of the present invention.

FIG. 2 is a cross-sectional view of the present invention taken along line 2—2 of FIG. 1 showing the device in the unactuated position.

FIG. 3 is the cross-sectional view of FIG. 2 showing the device in the actuated position.

DETAILED DESCRIPTION OF THE INVENTION

Figure 4:
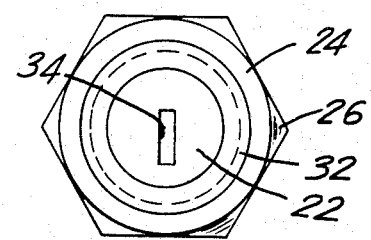
FIG. 4 is an end view of the device showing the key-hole.

Referring to the drawings, in FIG. 1 there is shown the check valve 10 having lock housing 12 and hydraulic cylinder 14. The hydraulic cylinder 14 has brake fluid inlet 16 extending along the longitudinal axis of the valve 10 and brake fluid outlet 18 that extends on an axis perpendicular to the longitudinal axis.

As shown in the illustrative embodiment in FIG. 1, the device 10 can be actuated by key 20 which turns the lock 22. The round nut 24 and the adjusting nut 26 are used for mounting the device 10 through the dashboard of an automobile.

As shown in FIG. 2, lock housing 12 includes an elongated bore 28 through which the lock 22 is disposed. A lock sleeve 30 is positioned in the reduced end of the bore 28 in the space between the lock 22 and the threaded end 32 of the housing 12. As shown, the end 32 is threaded on its outer surface to allow the adjusting nut 26 and round nut 24 to be threaded thereon.

Figures 5, 6:
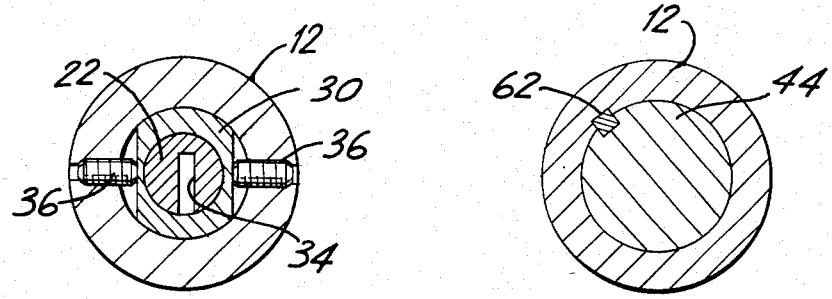
FIG. 5 is a cross-sectional view taken along line 5—5 of FIG. 2.
FIG. 6 is a cross-sectional view taken along line 6—6 of FIG. 2.

As shown in FIG. 4, the lock 22 has a keyway 34 for receiving the key 20 for actuating the device 10. As shown in FIGS. 2 and 5, a pair of set screws 36 are threaded through the housing 12 to further secure the lock 22 within the housing 12.

Figures 8A, 8B:
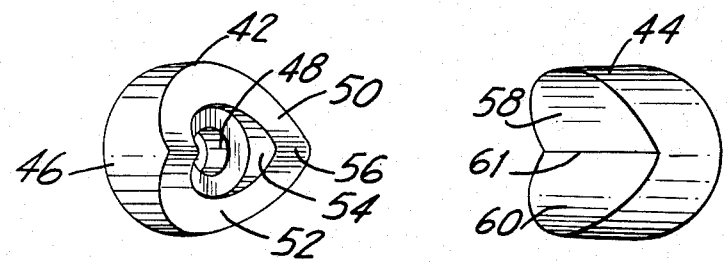
FIG. 8a is a perspective view of the male cam of the invention.
FIG. 8b is a perspective view of the female cam of the invention.

Extending from the innermost end of the lock 22 is a threaded knob member 38 which engages a rotary cam means 40 located within the enlarged portion of the elongated bore 28. The rotary cam means 40 includes a male cam 42 that is in contact with a female cam 44. The male cam 42 is a wedge shaped cam wherein the base 46 of the wedge has a bore 48 through which the knob member 38 extends. The tapered surfaces 50 and 52 of the male cam 42 also have a bore 54 that partially extends across the vertex line 56 of the wedge shaped cam 42 as shown in FIGS. 3 and 8a. The bore 54 is axially aligned with and is of a larger diameter than the bore 48 in order to receive a nut 49 that is threaded onto the knob member 38 to secure the lock 22 to the male cam 42 (FIG. 3).

The female cam 44 has tapered surfaces 58 and 60 that meet at line 61 forming a V-shape that is complementary to the wedge shaped cam 42 (FIG. 8b). As shown in FIG. 6, a key 62 is provided in complementary grooves between the female cam 44 and the lock housing 12 to prevent the rotation of the female cam 44. As shown in FIG. 2, when the device is in the inoperative state, the tapered surfaces 50 and 52 of the male cam 42 are in flush contact with the tapered surfaces 58 and 60 of the female cam 44 and the lines 56 and 61 will be parallel and adjacent to each other (FIGS. 8a and 8b). When the lock has been rotated 90°, as shown in FIG. 3, the male cam 42 rotates 90° so that the line 56 is perpendicular to the line 61 and the tapered surfaces 50 and 52 are spaced from the tapered surfaces 58 and 60. In other words, the male cam 42 of FIG. 8a is rotated 90° relative to the female cam of FIG. 8b. Since the female cam 44 is prevented from rotating because of the key 62, the rotation of the male cam 42 causes the female cam 44 to be thrust away from the male cam 42, as shown in FIG. 3.

On the end of the female cam 44 opposite the tapered surfaces 58 and 60 there is a central notch 64 which receives one end of a rod 66. The rod 66 extends from within the lock housing 12 into the hydraulic cylinder 14. The hydraulic cylinder 14 is threaded into the lock housing 12 along threads 68 and is axially aligned with the lock housing 12 at the end opposite the lock 22. A washer 70 separates the cylinder 14 from the lock housing 12. Within the cylinder 14, is a seal 72 and a seal cup 74 which butt against the washer 70. The seal 72 and seal cup 74 have respective apertures 76 and 78 centrally located through which the rod 66 extends. The cup 74 can be made from neoprene and is designed to contain liquid and prevent leakage.

A fluid chamber 80 is located within the cylinder 14 which is in fluid communication with the inlet 16 and the outlet 18. A valve seat 82 is mounted within the fluid chamber 80 covering the opening of the fluid inlet 16 facing the fluid chamber 80. A spring 84 is disposed within the fluid chamber 80 and is biased so as to be about the seat 82 and press against the adjacent inner end 85 of the cylinder 14 at one end, and a spring cup or piston 86 at the opposite end. A valve element or a steel ball 88 is snapped and held within the spring 84.

Figure 7:
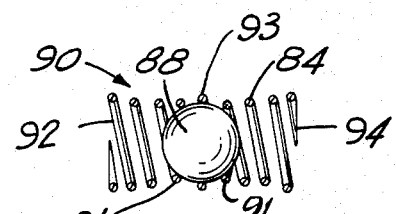
FIG. 7 is a detail of the spring having the ball enclosed therein.

As shown in FIG. 7, spring 84 is uniquely coiled to tightly hold the ball 88 within the spring 84. The coils 90 of the spring 84 generally are tapered inwardly so that coils 91 adjacent the center coil 93 have a smaller diameter than the coils 90 at the ends 92 and 94. The diameter of the coils adjacent the center 93 are smaller than the diameter of the ball 88 while the diameter of the coils at the ends 92 and 94 are larger than the ball 88. The coils are flexible so that when the ball 88 is inserted within the spring 84, the central coils expand to the diameter of the ball 88 to tightly coil around the ball 88. As shown in FIG. 7, the center coil 93, however, has a larger diameter than the adjacent coils 91 to accommodate and receive the ball 88 therewithin.

Prior to operation, the male cam 42 and the female cam 44 are aligned in complementary fashion as shown in FIG. 2. In this inoperative state, the spring 84 and the ball 88 are aligned as shown in FIG. 2 wherein the ball 88 is spaced from the valve seat 82 permitting fluid flow between the inlet 16 and the outlet 18 allowing the brakes to operate normally. In operation, the key 20 is turned 90° turning the lock 22 and the male cam 42 90°. As described earlier, the rotation of the male cam 42 thrusts the female cam 44 towards the cylinder 14. This in turn, causes the rod 66 to be thrust forward which is in communication with the spring cup or piston 86. The movement of the rod 66 into the fluid chamber 80 compresses the spring 84 against the end 85. This forces the ball 88 to seat flush against the valve seat 82 thereby restricting fluid flow between the inlet 16 and the outlet 18. If the brake pedal is depressed prior to actuating the check valve 10, thereby pressurizing the fluid line, the actuation of the device 10 will immediately lock the brakes by preventing fluid to return from the brakes to the master cylinder. If the brake pedal is not depressed when the device 10 is actuated, the brakes will lock as soon as the brake pedal is depressed. The depression of the brake pedal will force the ball 88 away from the valve seat 82 to allow fluid to flow through the cylinder 14 to pressurize the brakes. Thereafter, a release of the brakes and the return fluid flow will force the ball 88 against the valve seat 82, restricting the fluid flow and locking the brakes. Once the brakes are locked, they may be unlocked only by inserting the key 20 into the lock 22 and rotating the cam mechanism 40 to the unlocked position and thereafter depressing the brake pedal in order to release the ball from the valve seat. The depression of the brakes at this time will force the ball 88 to return to the original or unlocked position shown in FIG. 2.

The invention in its broader aspects, therefore, is not limited to the illustrative embodiment and departures may be made therefrom within the scope of the accompanying claims without departing from the principles of the invention and without sacrificing its chief advantages.

What is claimed is:

1. A device for locking the brakes of a vehicle having a fluid brake system adapted to be connected in the brake fluid line between the master cylinder and at least one wheel brake cylinder, comprising:

a hydraulic cylinder having a brake fluid inlet and outlet and a fluid chaxber connecting said inlet and outlet;

a valve seat within said fluid chamber in fluid communication with said inlet;

a valve element within said fluid chamber including a ball having a diameter greater than the diameter of the inlet to said fluid chamber adapted to press against said valve seat to restrict the fluid flow through said fluid chamber; and means for pressing said ball against said valve seat including a compressible coil spring for holding said ball therein, wherein compression of said spring causes said ball to Press against said valve seat thereby restricting the fluid flow through the inlet of said hydraulic cylinder, and wherein said coil spring includes ends having a diameter greater than the diameter of said ball and a central portion for holding said ball having a diameter less than the diameter of said ball, so that upon insertion of said ball, said central portion will expand to tightly coil around and firmly hold said ball therewithin.

2. The device of claim 1 wherein said ball consists essentially of steel.

3. A device for locking the brakes of a vehicle having a fluid brake system adapted to be connected in the brake fluid line between the master cylinder and at least one wheel brake cylinder, comprising:

a hydraulic cylinder having a brake fluid inlet and outlet and a fluid chamber connecting said inlet and outlet;

a valve seat within said fluid chamber in fluid communication with said inlet;

a spring disposed within said fluid chamber and being coiled so as to hold a valve element therein;

means for compressing said spring, including complementary wedge shaped male and female cams wherein rotation of said male cam thrusts said female cam toward said spring, and a piston means connected between said female cam and said spring for compressing said spring as said female is thrust toward said spring whereupon said spring causes said valve element to press against said valve seat and restrict the fluid communication between said inlet and said outlet; and means for actuating said spring compressing means including a key operated lock mechanism connected to said male cam wherein rotation of said lock causes said male cam to rotate.

4. A device for locking the brakes of a vehicle having a fluid brake system adapted to be connected in the brake fluid line between the master cylinder and at least one wheel brake cylinder, comprising:

a housing having a bore therein;

a hydraulic cylinder axially aligned and connected to said housing and having a brake fluid inlet and outlet and a fluid chamber connecting said inlet and outlet;

a valve seat within said fluid chamber in fluid communication with said inlet;

a spring disposed within said fluid chamber and being coiled so as to hold a valve element therein;

a rotary cam means within said elongated bore for compressing said spring including a wedge shaped male cam having tapered surfaces in communication with the oppositely tapered surfaces of a V-shaped female cam axially aligned with said male cam, wherein rotation of said male cam thrusts said female cam toward said spring, and a piston means connected between said female cam and said spring for compressing said spring; and means in said elongated bore for actuating said rotary cam means thereby compressing said spring which causes said valve element to press against said valve seat thereby restricting the fluid communication between said inlet and said outlet.

5. The device of claim 4, wherein the actuating means includes a key operated lock mechanism within said elongated bore being connected to said male cam whereby rotation of said lock causes said male cam to rotate.

* * * * *